United States Patent [19]
Dixon et al.

[11] Patent Number: 5,775,264
[45] Date of Patent: Jul. 7, 1998

[54] ANIMAL TETHERING SYSTEM

[76] Inventors: Randall W. Dixon; Joseph L. Dixon; Emmett L. Griffeth, all of P.O. Box 2210, Lawrenceville, Ga. 30246

[21] Appl. No.: 850,691

[22] Filed: May 2, 1997

[51] Int. Cl.⁶ .................................................. A01K 1/04
[52] U.S. Cl. .................................................. 119/771
[58] Field of Search ............................ 119/771, 772, 119/774, 769, 777, 778, 779, 783, 780; 278/28; 280/288.4, 292

[56] References Cited

U.S. PATENT DOCUMENTS

| 68,906 | 9/1867 | Sargent et al. | 119/780 |
| 86,587 | 2/1869 | Race. | |
| D. 269,556 | 6/1983 | Studley et al. | |
| 374,646 | 12/1887 | Adams | 119/780 |
| 444,661 | 1/1891 | Carl | 119/780 |
| 606,922 | 7/1898 | Gates. | |
| 911,504 | 2/1909 | Jay | 119/780 X |
| 1,181,881 | 5/1916 | Hausz | 119/780 |
| 1,579,294 | 4/1926 | Fisk | 119/780 X |
| 2,981,230 | 4/1961 | Putnam | 119/780 |
| 3,222,034 | 12/1965 | Jackson | 280/288.4 X |
| 4,134,364 | 1/1979 | Boncela. | |
| 4,159,142 | 6/1979 | Larson | 119/61 |
| 4,546,730 | 10/1985 | Holland | 119/780 |
| 5,033,409 | 7/1991 | Sabot. | |

Primary Examiner—Michael J. Carone
Assistant Examiner—Yvonne R. Abbott
Attorney, Agent, or Firm—Hinkle & Associates, P.C.

[57] ABSTRACT

An animal tethering system (10) has a frame (16) with an upper arm (22) and a lower arm (24) extending from the upper arm for support pivotally mounted to a structure (12). To secure the frame in an extended position, a brace (34) is provided which is removably mounted at a brace mounting end (36) to the structure and is connected to the frame at the upper arm. In one embodiment, the brace is removably mounted to the frame. Another embodiment has the brace pivotally mounted to the frame and the frame has a channel (28) to nestingly receive the brace for storage.

14 Claims, 3 Drawing Sheets

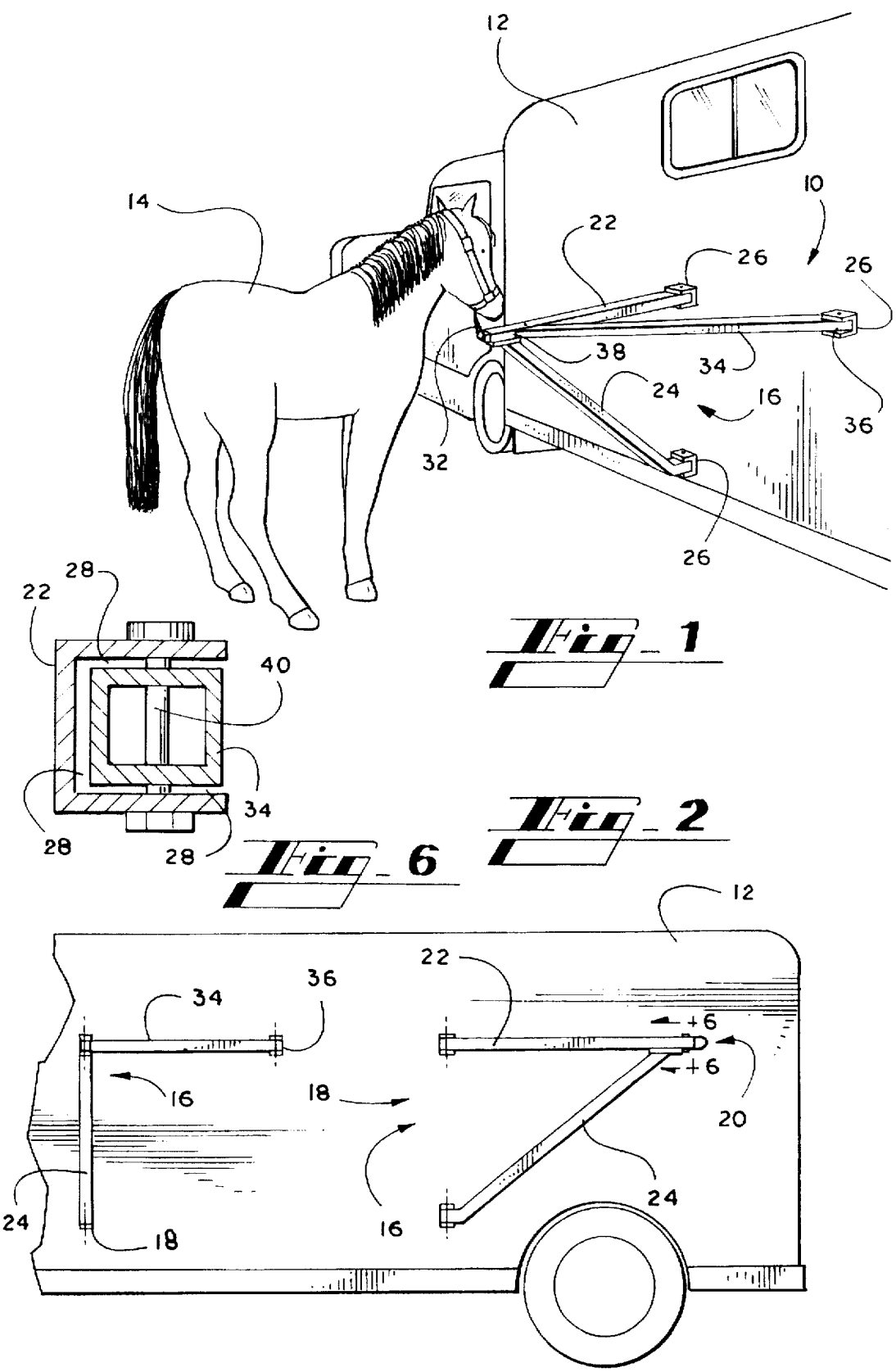

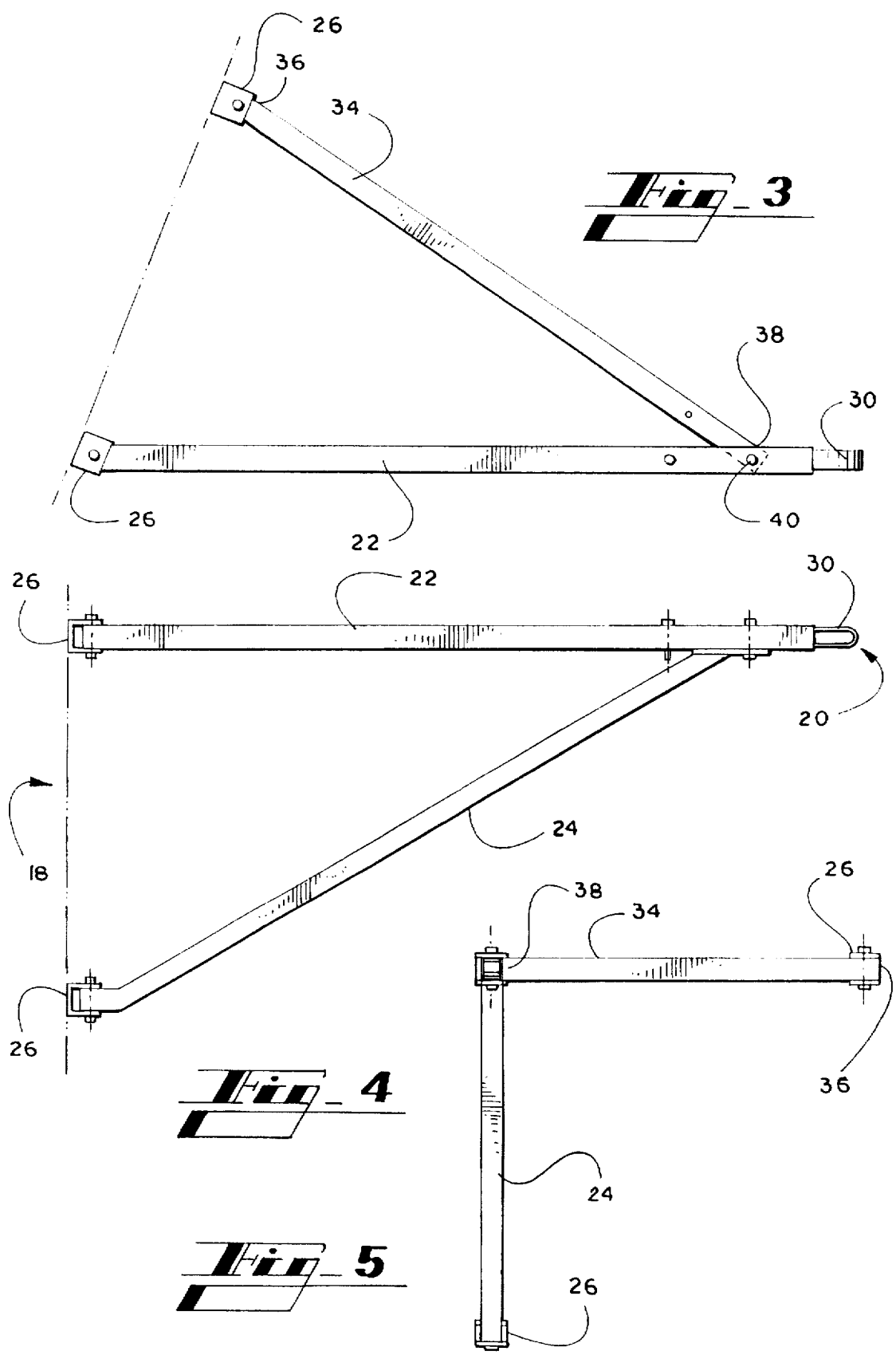

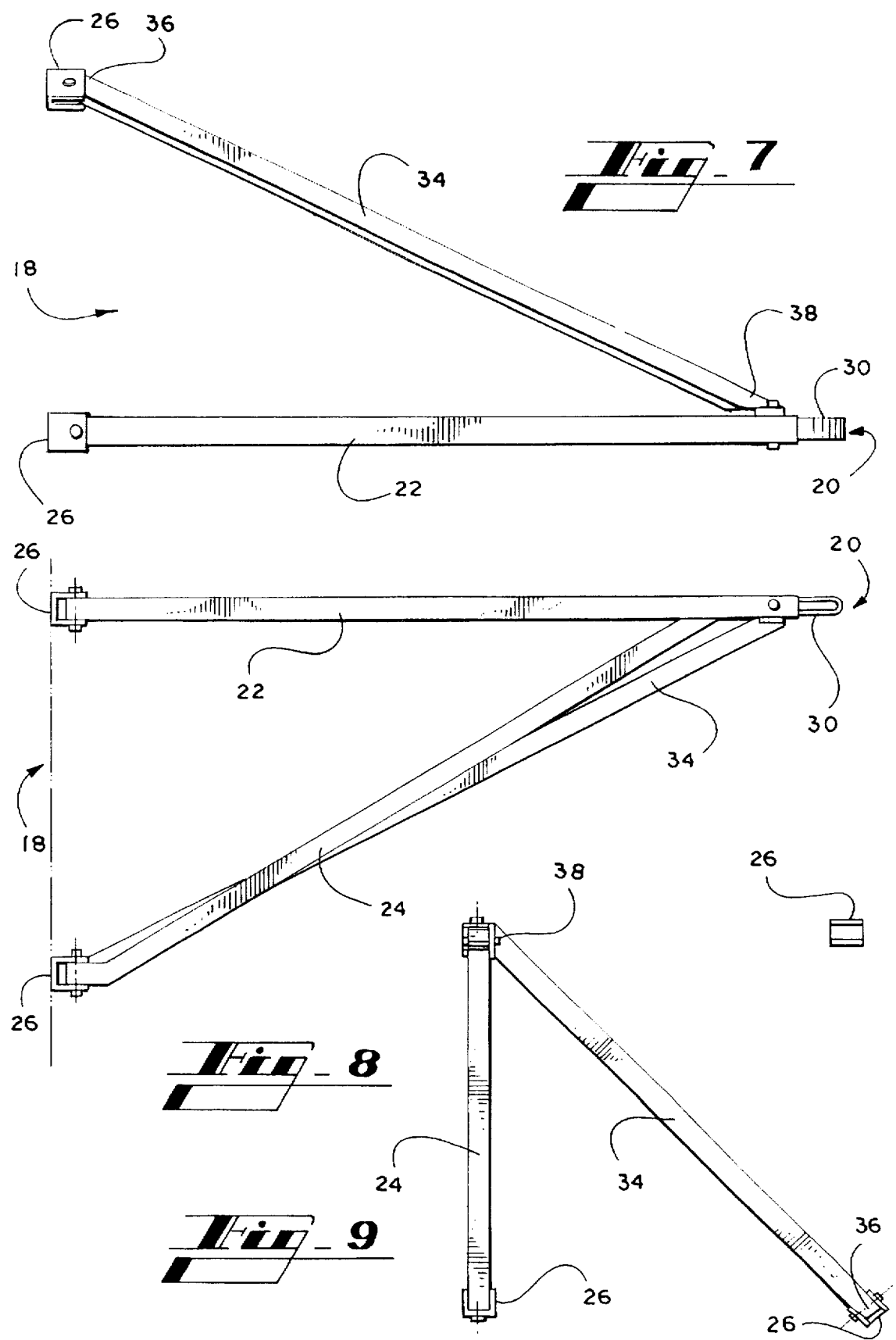

ANIMAL TETHERING SYSTEM

BACKGROUND OF THE INVENTION

I. Field of the Invention

The present invention relates generally to the field of tethering devices. More particularly, the present invention relates to a retractable animal tethering system.

II. Description of the Related Art

It is well known to tie a halter lead of an animal, such as equine or bovine animals, to a rail or a ring mounted to a fixed object. However, the animal, especially a horse, when tied in this position for a period of time, tends to become bored and will start chewing on the fixed object, eating paint or possibly kicking the object. There is therefore a need to keep the animal away from the fixed object.

U.S. Pat. No. 269,556 issued to Studley et al. shows a Horse Tethering Support having a pair of arms in a basic cantilever construction. This device lacks a third arm to prevent pivotal movement of the support.

A Dog Exercising Device described in U.S. Pat. No. 5,033,409 by Sabot removably mounts to a bicycle frame. The device has three bars which are individually secured to appropriate locations on the frame using hook and loop materials at one respective end and are joined at the respective other end. A bungee cord is secured to the joined ends of the bars to receive a dog's leash. At an outer end of each bar is an extension and the extensions are pivotally joined. This device can not be stored on the bicycle without extending outwardly therefrom.

SUMMARY OF THE INVENTION

In accordance with the present invention and the contemplated problems which have and continue to exist in this field, the objectives of this invention are to provide an animal tethering system that is novel and improved over the prior art.

Traveling with animals poses a particular problem in that tethering facilities may not be readily available at the new location. Thus, it is another objective to provide an animal tethering system that is mounted to a structure, such as a trailer, that extends outwardly from the structure when in use and conveniently retracts when not in use, especially when structure is being moved.

It is yet another objective of the animal tethering system to provide a frame that is pivotally mounted to the structure and a brace to retain the frame in an extended position.

Still, it is another objective of the animal tethering system to provide a brace that is removable from the frame and the structure.

Even still, it is another objective of the animal tethering system to provide a frame having a channel to receive a brace within the channel for easy storage of the frame on the structure.

Yet still, it is another objective of the animal tethering system to provide a tether that keeps the animal separated from the structure.

This invention accomplishes the above and other objectives and overcomes the disadvantages of the prior art by providing an animal tethering system that is simple in design and construction, inexpensive to fabricate, and easy to use. The animal tethering system has a frame with an upper arm and a lower arm, which extends from the upper arm to provide the upper arm support, pivotally mounted to a structure. To secure the frame in an extended position, a brace is provided which is removably mounted at a brace mounting end to the structure and is connected to the frame at a brace connecting end to the upper arm. In one embodiment, the brace is removably mounted to the frame. Another embodiment has the brace pivotally mounted to the frame and the frame has a channel to nestingly receive the brace for storage.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing the preferred embodiment of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 1 is a perspective view of an embodiment of an animal tethering system made in accordance with the present invention;

FIG. 2 is a front elevation view of the embodiment of FIG. 1 showing the invention in an extended position and a stored position;

FIG. 3 is a top view of the embodiment of FIG. 1;

FIG. 4 is a side elevation view of the embodiment of FIG. 1;

FIG. 5 is another front elevation view of the embodiment of FIG. 1;

FIG. 6 is a partial cross-section view of the embodiment of FIG. 1 in a stored position taken along line 6—6;

FIG. 7 is a top view of another embodiment of the animal tethering system made in accordance with the present invention;

FIG. 8 is a side elevation view of the embodiment of FIG. 7; and,

FIG. 9 is a front elevation view of the embodiment of FIG. 7.

The reference numbers in the drawings relate to the following:

10=animal tethering system
12=structure
14=animal
16=frame
18=first end of frame
20=second end of frame
22=upper arm
24=lower arm
26=bracket
28=channel
30=loop
32=halter lead 34=brace
36=brace mounting end
38=brace connecting end
40=pivot pin

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates an embodiment of an animal tethering system 10 made in accordance with the present invention.

Referring now to FIGS. 1 through 6, the animal tethering system 10 is well suited for use with a structure 12, such as the wall of an animal trailer, barn, fence and so on, to tether an animal 14 so that the animal 14 cannot damage the structure 12. One portion of the animal tethering system 10 comprises a frame 16 which has a first end 18, a second end 20, an upper arm 22 and a lower arm 24. The lower arm 24 extends generally downwardly from the upper arm 22 proximate the second end 20 to the first end 22. Brackets 26 are mounted to the structure 12 and are spaced-apart to respectively receive the upper and lower arms 22 and 24. The upper and lower arms 22 and 24 are pivotally mounted to the brackets 26 at the first end 20, respectively, so the frame 16 can be pivoted from a stored position, as displayed on the right side of FIG. 2, to an extended position, as displayed on the left side of FIG. 2. A channel 28 extends from the first end 18 to the second end 20 of the upper arm 22. At the second end 20 of the upper arm 22, a loop 30 extends outwardly to receive a halter lead 32 from the animal 14. Additionally, the halter lead 32 can be secured directly to either or both the upper and lower arms 22 and 24.

A brace 34 having a brace mounting end 36 and a brace connecting end 38 is provided to secure the frame 16 in the extended position. In this embodiment, the brace 34 is pivotally mounted at the brace connecting end 38 to the upper arm 22 proximate the second end 20 and within the channel 28 by a pivot pin 40 so that the brace 34 can completely nest in the channel 28, as shown in FIG. 6. Another bracket 26 is mounted to the structure 12 adjacent the frame 16 so that it removably engages the brace mounting end 38 while the frame 16 is in the extended position. This adjacent bracket 26 is also positioned so that it removably engages the frame 16, preferably removably engaging the upper arm 22, while the frame 16 is in the stored position. To nest the brace 34 within the channel 28, pivot the brace 34 about the pivot pin 40 until the brace mounting end 36 is disposed within the channel 28. The length of the brace 34 should not exceed the length of the channel 28.

It is apparent that the channel 28 can be provided in the lower arm 24. In such an embodiment, the brace 34 is pivotally mounted at the brace connecting end 38 to the lower arm 24 proximate the second end 20 and within the channel 28. The brace 34, therefore, nests within the channel 28 of the lower arm 24.

Referring now to FIGS. 7 through 9, in this embodiment of the animal tethering system 10, the brace 34 is removably mounted to both the structure 12 and the frame 16. Because the brace 34 is removable from the frame 16, the channel 28 is not needed in this embodiment. The brace 34 is removably mounted at the brace connecting end 38 to the upper arm 22 proximate the second end 20. As shown in the drawings, the brace 34 extends downwardly and outwardly from the upper arm 22 to the bracket 26 which is matingly positioned to receive and removably engage the brace mounting end 36. It is not required for the brace 34 of this embodiment to extend downwardly, and accordingly, can extend outwardly in any direction toward the structure 12 from the frame 16. As shown in FIG. 9, an additional bracket 26 is provided to removably engage the frame 16 while the frame 16 is in the stored position. This additional bracket 26 is optionally provided when the bracket 26 that removably engages the brace mounting end 36 is out of position with respect to the frame 16 to effect removable engagement of the frame 16. To place the frame 16 in the stored position, the brace 34 is removed from the frame 16 and the bracket 26 that engages the brace mounting end 36, and the frame 16 is pivoted into contact with the structure 12. The brace 34 is then stored separately from the frame 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An animal tethering system for attachment to a structure and receiving a lead of an animal, comprising:
    a frame having a first end and a second end and being pivotally mounted to the structure at the first end, the frame having an upper arm and a lower arm extending from and supporting the upper arm;
    a bracket mounted to the structure and the bracket being positioned on the structure to receive and releasably retain the frame while the frame is in a stored position;
    a brace being removably mounted to the structure and operably connected to the frame to secure the frame in an extended position;
    connecting means for operably connecting the brace to the frame; and,
    tether means proximate the second end of the frame for receiving the lead of the animal.

2. An animal tethering system as claimed in claim 1, wherein the brace has a brace mounting end and the brace mounting end releasably engages the bracket.

3. An animal tethering system as claimed in claim 2, further comprising another bracket being mounted to and positioned on the structure to receive and releasably retain the brace mounting end.

4. An animal tethering system as claimed in claim 3, wherein connecting means is defined as the brace connecting end being removably mounted to the frame.

5. An animal tethering system as claimed in claim 4, wherein the brace connecting end is removably mounted to the upper arm proximate the second end of the frame.

6. An animal tethering system as claimed in claim 4, wherein tether means is a loop extending from the upper arm proximate the second end.

7. An animal tethering system as claimed in claim 1, wherein connecting means is defined as the brace having a brace connecting end and the brace connecting end is removably mounted to the frame.

8. An animal tethering system as claimed in claim 7, wherein the brace connecting end is removably mounted to the upper arm proximate the second end of the frame.

9. An animal tethering system as claimed in claim 1, wherein the connecting means is defined as the brace having a brace connecting end, the frame having a channel for receiving the brace, and the brace being pivotally mounted at the brace connecting end to the frame so as to be nestable within the channel.

10. An animal tethering system as claimed in claim 1, wherein tether means is a loop extending from the upper arm proximate the second end.

11. An animal tethering system for attachment to a structure and receiving a lead of an animal, comprising:

- a frame having a first end and a second end and being pivotally mounted to the structure at the first end, the frame having an upper arm and a lower arm extending from and supporting the upper arm;
- a brace being removably mounted to the structure and removably mounted to the frame to secure the frame in an extended position;
- a bracket being mounted to the structure to receive and releasably retain the frame while the frame is in a stored position; and,
- a loop proximate the second end of the frame for receiving the lead of the animal.

12. An animal tethering system as claimed in claim 11, wherein the brace has a brace mounting end and the bracket is positioned on the structure to receive and releasably retain the brace mounting end of the brace.

13. An animal tethering system as claimed in claim 11, wherein the brace has a brace mounting end and further comprises another bracket mounted to the structure to receive and releasably retain the brace mounting end of the brace.

14. An animal tethering system for attachment to a structure and receiving a lead of an animal, comprising:

- a frame having a first end and a second end and being pivotally mounted to the structure at the first end, the frame having an upper arm and a lower arm extending from and supporting the upper arm, the upper arm having a channel;
- a brace being removably mounted to the structure and pivotally mounted to the upper arm within the channel proximate the second end for securing the frame in an extended position and being pivotably disposed and nested within the channel while the frame is in a stored position, the brace having a brace mounting end;
- a bracket being mounted to the structure to receive and releasably retain the brace mounting end while the frame is in the extended position and to receive and releasably retain the frame while the frame is in the stored position; and,
- a loop extending from the upper arm proximate the second end of the frame for receiving the lead of the animal.

* * * * *